US011512599B1

(12) United States Patent
Webster et al.

(10) Patent No.: US 11,512,599 B1
(45) Date of Patent: Nov. 29, 2022

(54) COMPONENT WITH COOLING PASSAGE FOR A TURBINE ENGINE

(71) Applicant: GENERAL ELECTRIC COMPANY, Schenectady, NY (US)

(72) Inventors: Zachary Daniel Webster, Mason, OH (US); Daniel Endecott Osgood, Cincinatti, OH (US); Kirk Douglas Gallier, Cincinatti, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/491,828

(22) Filed: Oct. 1, 2021

(51) Int. Cl.
  *F01D 5/18* (2006.01)
  *F01D 5/08* (2006.01)

(52) U.S. Cl.
  CPC ............. *F01D 5/187* (2013.01); *F01D 5/087* (2013.01); *F05D 2260/201* (2013.01); *F05D 2260/232* (2013.01)

(58) Field of Classification Search
  CPC .... F01D 5/187; F01D 5/087; F05D 2260/201; F05D 2260/232
  See application file for complete search history.

(56) References Cited

U.S. PATENT DOCUMENTS

| | | | |
|---|---|---|---|
| 4,487,550 A * | 12/1984 | Horvath | F01D 5/20 416/97 A |
| 5,660,523 A | 8/1997 | Lee | |
| 6,991,430 B2 | 1/2006 | Stec et al. | |
| 7,537,431 B1 * | 5/2009 | Liang | F01D 5/187 415/115 |
| 7,645,123 B1 | 1/2010 | Liang | |
| 8,043,059 B1 * | 10/2011 | Liang | F01D 11/122 416/97 R |
| 8,075,268 B1 | 12/2011 | Liang | |
| 8,303,254 B1 | 11/2012 | Liang | |
| 8,684,691 B2 | 4/2014 | Lee et al. | |
| 9,157,328 B2 | 10/2015 | Pope et al. | |
| 9,605,545 B2 | 3/2017 | Grohens et al. | |
| 10,156,144 B2 | 12/2018 | Quach et al. | |
| 10,612,391 B2 | 4/2020 | Rathay et al. | |
| 2006/0153680 A1 * | 7/2006 | Liang | F01D 5/187 416/97 R |
| 2012/0282108 A1 * | 11/2012 | Lee | F01D 5/20 416/97 R |

* cited by examiner

*Primary Examiner* — Eldon T Brockman
(74) *Attorney, Agent, or Firm* — McGarry Bair PC

(57) ABSTRACT

An apparatus and method for an engine component for a turbine engine having a working airflow separated into a cooling airflow and a combustion airflow. The engine component including a wall defining an interior and having an outer surface. A tip wall spanning first and second sides of the wall to close the interior. A tip rail extending from the tip wall and having an inner tip rail surface, which in combination with the tip wall, at least partially bounds a region defining a plenum. A rim formed in at least one of the outer surface and inner tip rail surface.

20 Claims, 13 Drawing Sheets

COMPONENT WITH COOLING PASSAGE FOR A TURBINE ENGINE

TECHNICAL FIELD

The disclosure generally relates to a cooling passage for an engine, and more specifically to a set of cooling passages for cooling a tip of an airfoil.

BACKGROUND

Turbine engines, and particularly gas or combustion turbine engines, are rotary engines that extract energy from a flow of combusted gases passing through the engine and flowing over a multitude of airfoils, including stationary vanes and rotating turbine blades.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades and other engine components generally include one or more interior cooling circuits for routing the cooling air through the engine component to cool different portions of the engine component, and can include dedicated cooling circuits for cooling different portions of the engine component.

BRIEF DESCRIPTION OF THE DRAWINGS

A full and enabling disclosure, including the best mode thereof, directed to one of ordinary skill in the art, is set forth in the specification, which makes reference to the appended figures in which.

DETAILED DESCRIPTION

Figure 1:
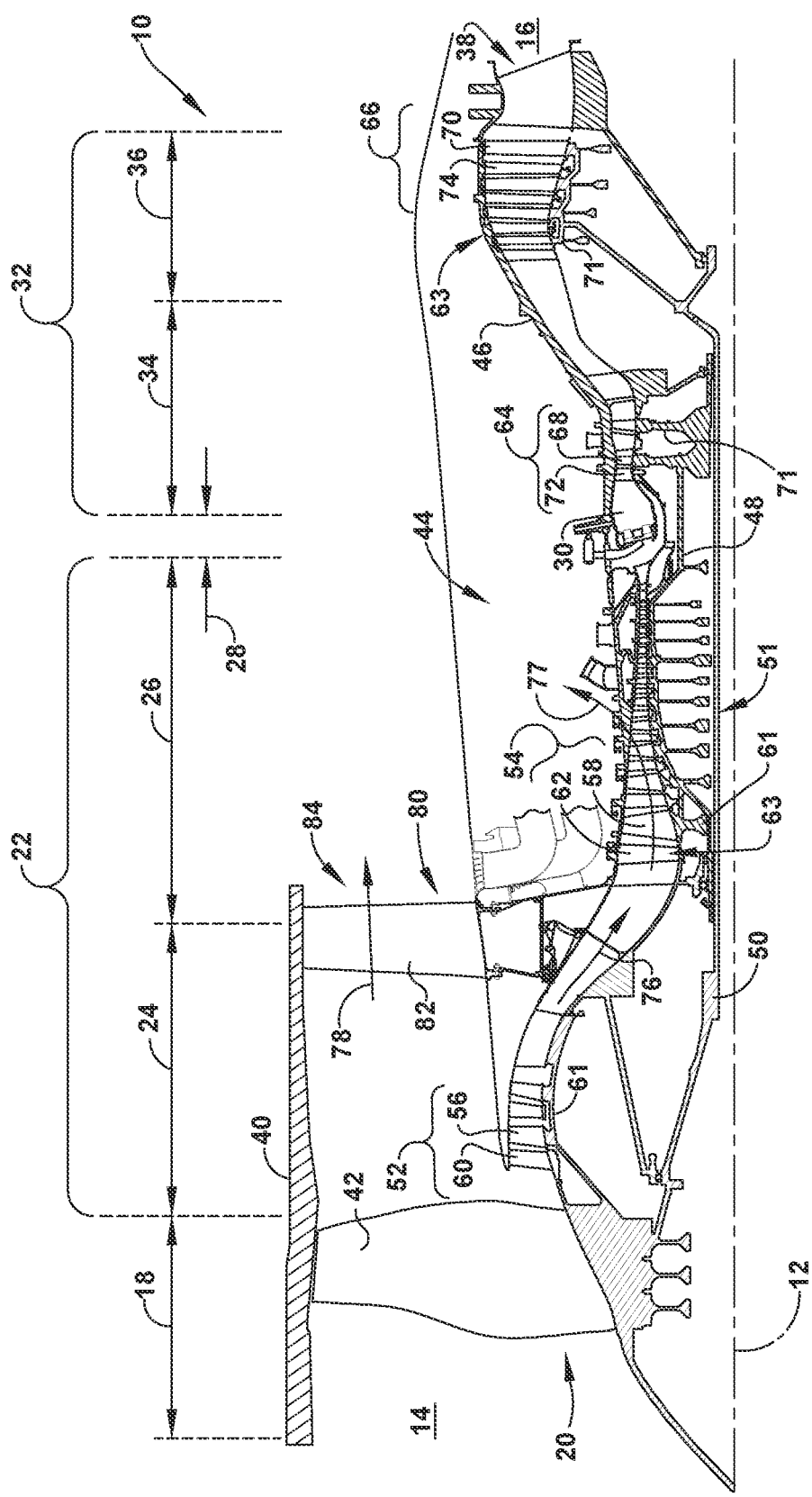
FIG. 1 is a schematic cross-sectional diagram of a gas turbine engine for an aircraft.

Aspects of the disclosure described herein are directed to a geometry for a diffusion slot of at least one cooling passage in a set of cooling passages. More specifically the diffusion slot terminates in an opening onto an outer surface of an engine component wall, in one non-limiting example the engine component is an airfoil. For purposes of illustration, the present disclosure will be described with respect to the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one. The use of the term "predetermined" herein relates to values that have been calculated for peak performance in the environment in which the component is located.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and an LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by a core casing 46, which can be coupled with the fan casing 40.

A HP shaft or spool 48 disposed coaxially about the centerline 12 of the engine 10 drivingly connects the HP turbine 34 to the HP compressor 26. An LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50. The static turbine vanes 72, 74 for a stage of the compressor can be mounted to the core casing 46 in a circumferential arrangement.

Complementary to the rotor portion, the stationary portions of the engine 10, such as the static turbine vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor.

A remaining portion of the airflow 78 bypasses the LP compressor 24 and engine core 44 and exits the engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
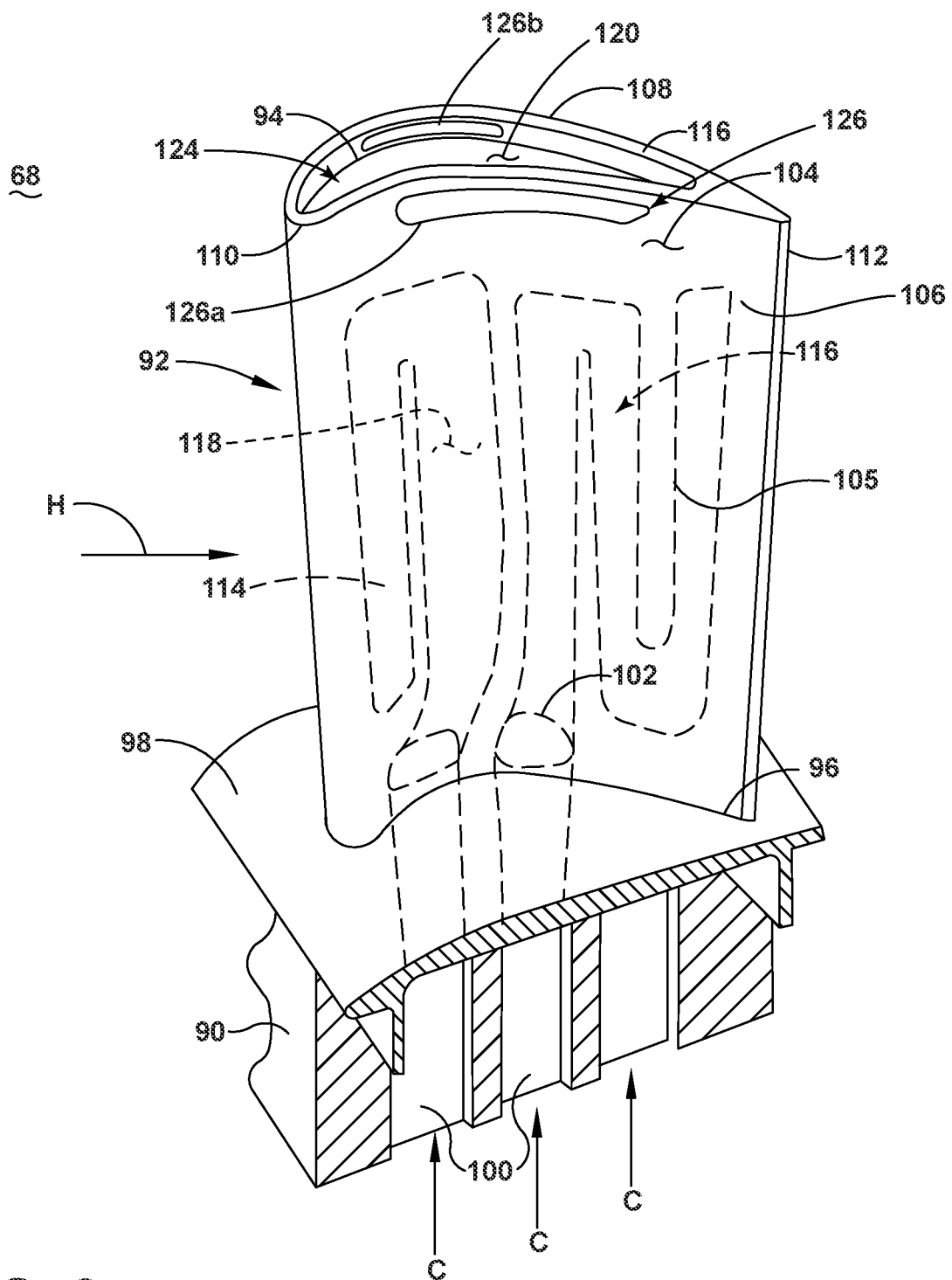
FIG. 2 is a perspective view of an exemplary airfoil of the engine of FIG. 1 in the form of a blade with a tip rail and two tip rims.

Referring now to FIG. 2, an engine component in the form of one of the turbine blades 68 of the engine 10 from FIG. 1 is shown. Alternatively, the engine component can be a vane, a strut, a service tube, a shroud, or a combustion liner in non-limiting examples, or any other engine component that can require or utilize cooling passages. The turbine blade 68 includes a dovetail 90 and an airfoil 92. The dovetail 90 further includes at least one inlet passage 100, shown as three exemplary inlet passages 100, each extending through the dovetail 90 to provide internal fluid communication with the airfoil 92 at a supply outlet 102. It should be appreciated that the dovetail 90 is shown in cross-section, such that the inlet passages 100 are housed within the body of the dovetail 90. The dovetail 90 can be configured to mount to a turbine rotor disk 71 on the engine 10 of FIG. 1, for example.

The airfoil 92 can extend radially between a tip 94 and a root 96 defining a span-wise direction therebetween. The airfoil 92 can mount to the dovetail 90 at a platform 98 at the root 96. The platform 98 helps to radially contain the turbine engine mainstream airflow. Additionally, the airfoil 92 can include an outer wall 104 having a first side 106 and a second side 108, and extending between an upstream edge 110 and a downstream edge 112 to define a streamwise direction therebetween. It should be understood that the upstream edge 110 can be a leading edge of the airfoil 92 and the downstream edge 112 can be a trailing edge of the airfoil 92. Further, the first side 106 can be a pressure side and the second side 108 can be a suction side of a turning blade as illustrated. It is also further contemplated that the airfoil 92 can be a non-turning vane, by way of non-limiting example a frame fairing. It is also further contemplated that neither the first or second sides 106, 108 are curved to form a pressure side and/or suction side. The outer wall 104 can partially define and surround at least one cooling conduit 114, shown as two exemplary cooling conduits 114 forming a cooling circuit 116.

An interior 118 defined by the outer wall 104 can be closed by a tip wall 120 at the tip 94. A tip rail 122, or squealer, defining a substantially continuous wall can extend outwardly from and around the periphery of the tip wall 120 to at least partially bound a region defining a plenum 124.

At least one tip rim 126 can be formed in the outer wall 104. The at least one tip rim 126 as described herein can be defined as an edge formed by an area of an exterior surface. By way of non-limiting example, the outer wall 104 or a tip rail surface 128, near the tip 94 is removed or cut away for the cooling passages 134 described herein to exhaust the cooling fluid (C). A first tip rim 126a can be formed in the outer wall 104 at the tip rail 122 on the first side 106. A second tip rim 126b can be formed in the tip rail 122 facing the plenum 124. The second tip rim 126b can be located between the tip wall 120 and an upper tip rail surface 132. The tip rim 126b can be a shelf 148 (FIG. 3) extending out from the tip wall 120 as a protrusion to or into the tip wall 120. It is contemplated that the tip rim 126 can be formed on any portion of the tip rail 122, as well as along the second side 108 of the tip rail 122 obscured in the perspective view. Unless otherwise noted, references to the tip rim 126 herein pertain to any tip rim, including but not limited to the first and second tip rims 126a, 126b.

In operation, a hot gas flow ($H_g$), such as a combustor flow, can pass along an exterior of the outer wall 104 of the airfoil 92 to define a heated surface. A cooling fluid flow (C) can be provided to the inlet passages 100 and into the airfoil 92 at the supply outlet 102, passing into the at least one cooling conduit 114. The cooling fluid flow (C) can be provided throughout the cooling circuit 116 and exhausted from the tip rim 126 as a cooling film. Any surfaces facing the cooling fluid flow (C) can be defined as a cooled surface.

Figure 3:
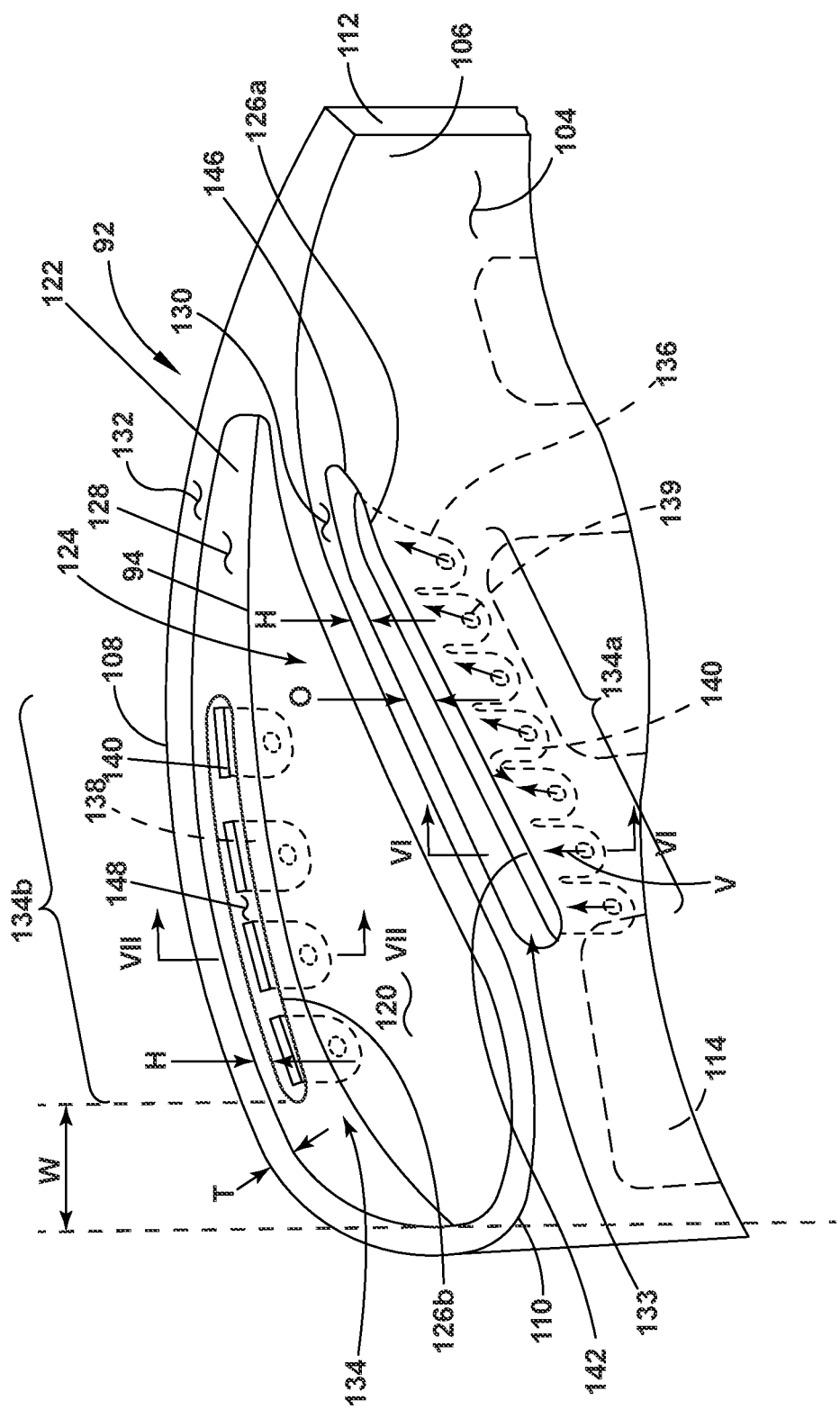
FIG. 3 is an enlarged perspective view of a tip of the airfoil of FIG. 2 illustrating multiple sets of cooling passages exhausting onto each of the two tip rims.

FIG. 3 is an enlarged perspective view at the tip 94 of the airfoil 92. The tip rail 122 projects from the tip wall 120 and has an inner tip rail surface 128 facing the plenum 124. An outer tip rail surface 130 can extend from at least one of the first and second sides 106, 108. In other words the outer tip rail surface 130 can be in the same plane as the exterior of the outer wall 104. The outer tip rail surface 130 can be spaced from the inner tip rail surface 128 to define a tip rail thickness (T). The tip rail 122 can radially terminate in the upper tip rail surface 132. The upper tip rail surface 132 can connect the inner tip rail surface 128 and the outer tip rail surface 130.

A cavity 133 can be located in the tip rail 122 and spaced from the upper tip rail surface 132 a predetermined height dimension (H). A portion of the cavity 133 can define the tip rim 126. In other words, the tip rim 126 can be defined as where the cavity 133 meets the outer wall 104. The tip rim 126 can begin downstream from the upstream edge 110 at a location spaced from the upstream edge 110 a predetermined width dimension (W). The cavity 133 can have a predetermined dimension opening (O) in the outer wall 104 or inner tip rail surface 128. The cavity 133 can extend in the streamwise direction to define a trench outlet 142. The trench outlet 142 can extend between the upstream edge 110 and the downstream edge 112. The trench outlet 142 can terminate in an edge wall 146 extending simultaneously toward the downstream edge 112 and the upper tip rail surface 132. In other words, the edge wall 146 can be angled with respect to the streamwise direction. It is further contemplated that the edge wall 146 extends vertically along the span-wise direction.

A set of cooling passages 134 can exhaust at the tip 94. The set of cooling passages 134 can define at least a portion of a variety of cooling holes, by way of non-limiting example in-line diffusers, diffusion slots, ejection holes, and trailing edge ejection holes. The sets of cooling passages 134 as described herein can be a single cooling passage or multiple cooling passages. The set of cooling passages 134 can be two sets of cooling passages a first set of cooling passages 134a exhausting on the first side 106 and a second set of cooling passages 134b exhausting into the plenum 124. Further, the set of cooling passages 134 can be arranged in a streamwise row. Optionally, another set of cooling passages can be provided on the second side 108, but is obscured by the perspective of FIG. 3. Unless otherwise noted, references to the set of cooling passages 134 herein pertain to any of the sets of cooling passages 134, including but not limited to the first and the second set of cooling passages 134a, 134b.

The first set of cooling passages 134a can include multiple cooling passages 136, by way of non-limiting example seven cooling passages 136 as illustrated. At least one of the cooling passages 136 can include a diffusion slot 138 opening onto the first tip rim 126a at a passage outlet 140. The diffusion slot 138 can be fluidly coupled to the at least one cooling conduit 114 via an intermediate outlet 139 also illustrated in phantom. Each diffusion slot 138 can define a diffuser vector (V) extending along a slot centerline (FIG. 5) toward the passage outlet 140. The corresponding diffuser vector (V) for each of the multiple cooling passages 136 point increasingly toward the downstream edge 112 moving from the upstream edge 110 toward the downstream edge 112.

Multiple passage outlets 140 can be merged together to form the trench outlet 142. The trench outlet 142 can define an entirety of the first tip rim 126a. The trench outlet 142 can open up into the cavity 133. The first tip rim 126a can therefore be a rim or edge of the outer wall 104 terminating at the cavity 133. The second set of cooling passages 134b can include multiple cooling passages 136, by way of non-limiting example four cooling passages 136 as illustrated. At least one of the cooling passages 136 can include a diffusion slot 138 opening into the trench outlet 142 at the passage outlet 140.

It is also contemplated that multiple passage outlets 140 can be spaced from each other to define the shelf 148 therebetween. The shelf 148 can extend into or away from the inner tip surface 128.

Figure 4:
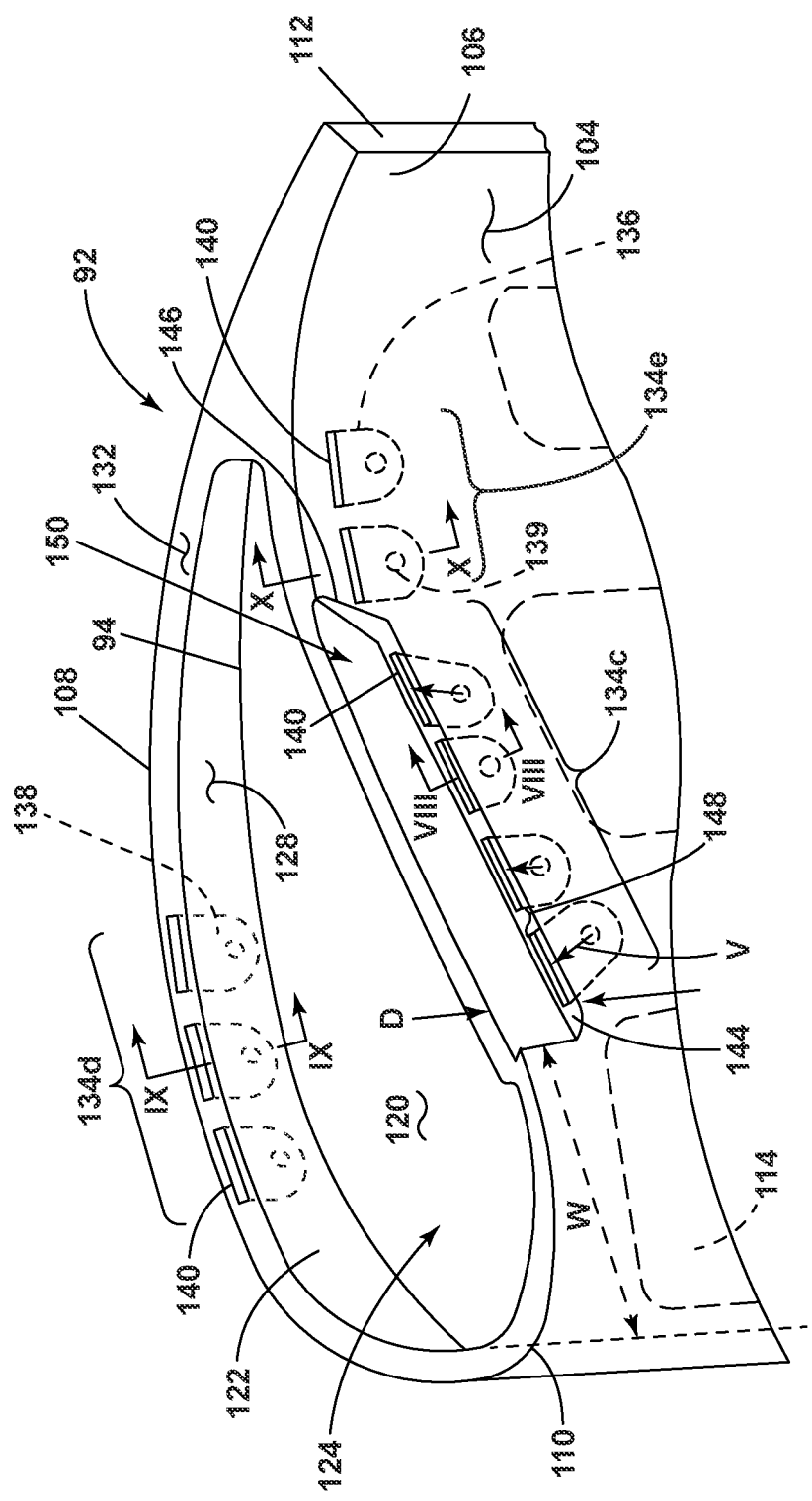
FIG. 4 is an enlarged perspective view of a tip of an airfoil similar to the airfoil of FIG. 2 illustrating multiple sets of cooling passages exhausting onto a third tip rim and an exterior of the airfoil and an upper surface of a tip rail of the airfoil.

FIG. 4 is an enlarged perspective view of a variation of the tip 94 of the airfoil 92 according to another aspect of the disclosure herein. A third tip rim 126c can be formed in the outer wall 104 at the tip rail 122 on the first side 106. The third tip rim 126c can include at least one of or all of the trench outlet 142, the edge wall 146, and the shelf 148 as described herein. Further, the third tip rim 126c can extend between the upstream edge 110 and the downstream edge 112 and begin downstream from the upstream edge 110 at a location spaced from the upstream edge 110 a predetermined width dimension (W). Additionally, the third tip rim 126c can define a pre-determined cut-out dimension (D) that extends all the way to the upper tip rail surface 132. In this manner, the third tip rim 126c is an open top cut-out 150 unlike that the cavity 133 previously described herein. The edge wall 146 can also terminate at the upper tip rail surface 132.

In this variation of the tip 94, a third, a fourth, and a fifth set of cooling passages 134c, 134d, 134e are illustrated. The third set of cooling passages 134c can include at least one cooling passage 136 where the diffusion slot 138 opens onto the third tip rim 126c at the passage outlet 140. The passage outlets 140 can be spaced in the streamwise direction to define the shelf 148 as previously described herein. The third set of cooling passages 134c can include multiple cooling passages 136, by way of non-limiting example four cooling passages 136 as illustrated.

The fourth set of cooling passages 134d can include at least one cooling passage 136 where the diffusion slot 138 opens onto the upper tip rail surface 132 at the passage outlet 140. The fourth set of cooling passages 134d can include multiple cooling passages 136, by way of non-limiting example three cooling passages 136 as illustrated.

The fifth set of cooling passages 134e can include at least one cooling passage 136 where the diffusion slot 138 opens onto the outer wall 104 along the first side 106 at the passage outlet 140. The fifth set of cooling passages 134e can include multiple cooling passages 136, by way of non-limiting example two cooling passages 136 as illustrated.

Each of the sets of cooling passages 134 described herein can include multiple cooling passages 136 each with a corresponding diffusions slot 138 having a corresponding passage outlet 140. The diffusion slot 138 can be fluidly coupled to the at least one cooling conduit 114 via the intermediate outlet 139 also illustrated in phantom. In some implementations, the diffusion slot 138 can be angled toward the upstream edge 110 or toward the downstream edge 112 or anywhere therebetween.

Each diffusion slot 138 can define a diffuser vector (V) as described herein. The corresponding diffuser vector (V) for each of the multiple cooling passages 136 can point toward the upstream edge 110, the upper tip rail surface 132, or the downstream edge 112 as illustrated. In other words the diffusion slots 138 can be arranged in a fanning layout from forward facing near the upstream edge 110, toward the upper tip rail surface 132 in the middle and aft facing near the downstream edge 112.

Figure 5:
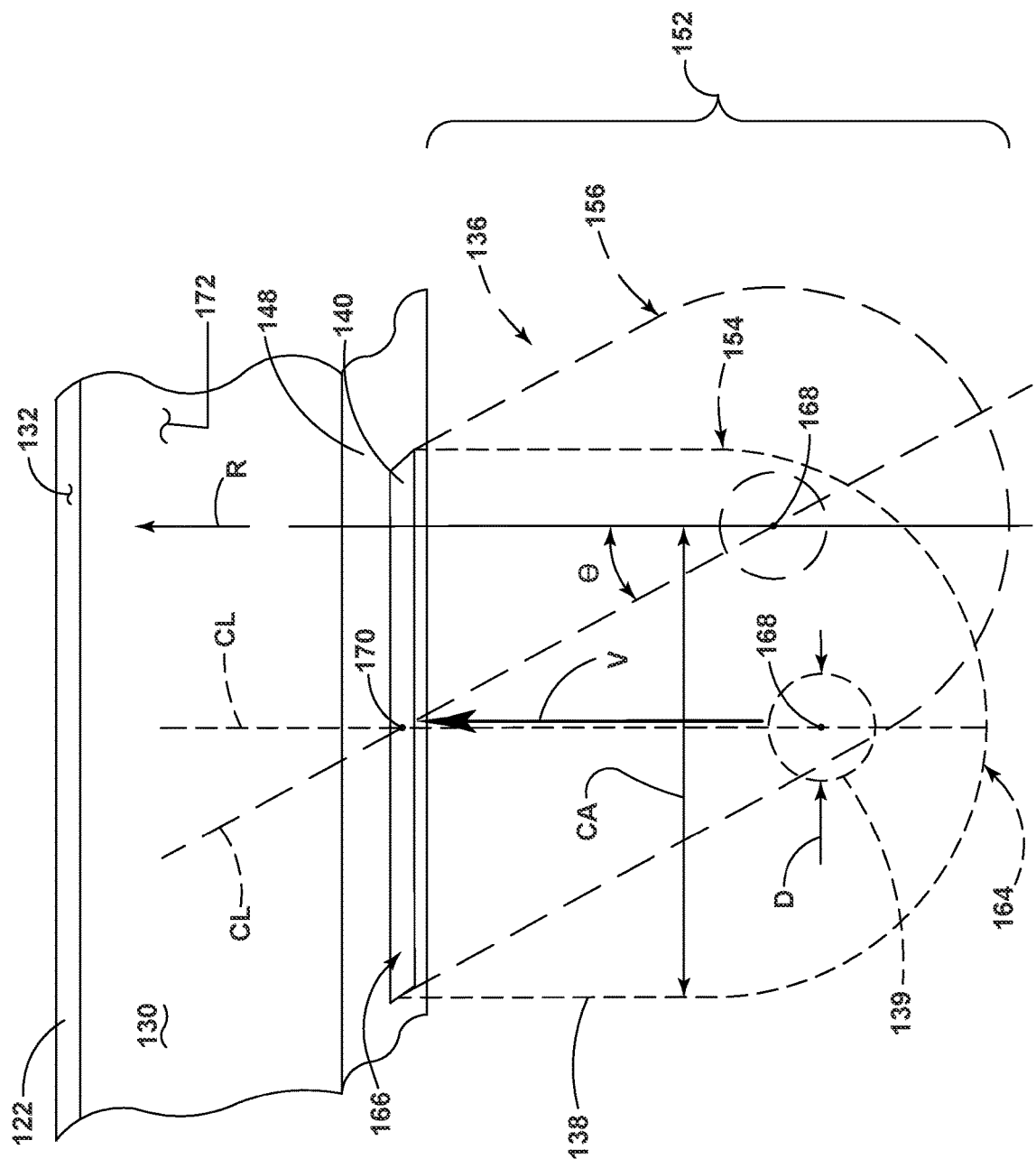
FIG. 5 is an enlarged view of the exemplary cooling passage from FIG. 4.

FIG. 5 is an exemplary enlarged view of one of the cooling passages 136. By way of non-limiting example, the cooling passage 136 is from the set of cooling passages 134c. To more clearly illustrate how the diffusion slot 138 can be angled, by way of non-limiting example, toward the leading edge 110, two orientations are illustrated in phantom, a radial orientation 154 and an angled orientation 156.

The diffusion slot 138 extends between a rear 164 and a front 166. The magnitude of the diffuser vector (V) can change with an extent, or length of the diffusion slot 138 between the rear 164 and the front 166. The intermediate outlet 139 can define a diameter (D). It should be understood that if the intermediate outlet 139 is of a non-circular shape the diameter (D) is the diameter of a circular cross-sectional area having the same area as the non-circular shape. The intermediate outlet 139 can be located proximate the rear 164, where "proximate" as used herein means within 0 and 50 diameters (D). The intermediate outlet 139 can be spaced from the rear 164 between 0 and 5 D (zero and five times the diameter (D)). The diffusion slot 138 can define a slot centerline (CL) extending between an intermediate center 168 of the intermediate outlet 139 and an outlet center 170 of the passage outlet 140. While illustrated as having a circular shape, it should be understood that the intermediate outlet 139 can have any shape and still define a geometric center. The diffusion slot 138 can define an increasing cross-sectional area (CA) extending from the rear 164 toward the passage outlet 140 along the slot centerline (CL). It is contemplated that the slot centerline (CL) can be in-line with a radial direction (R) as illustrated in the radial orientation 154. It is further contemplated that the slot centerline (CL) can form a first angle $\theta$ of between +/−70° with the radial direction (R) such that the diffusion slot 138 points toward the leading edge 110 and/or trailing edge 112.

The diffusion slot 138 can define a diffusing section 152. The diffusing section 152, and more particularly the geometry of the diffusion slot 138 enables an expansion of the cooling fluid (C) to form a wider and slower cooling film onto an exterior 172 of the airfoil 92, by way of non-limiting example the outer tip rail surface 130.

Figure 6:
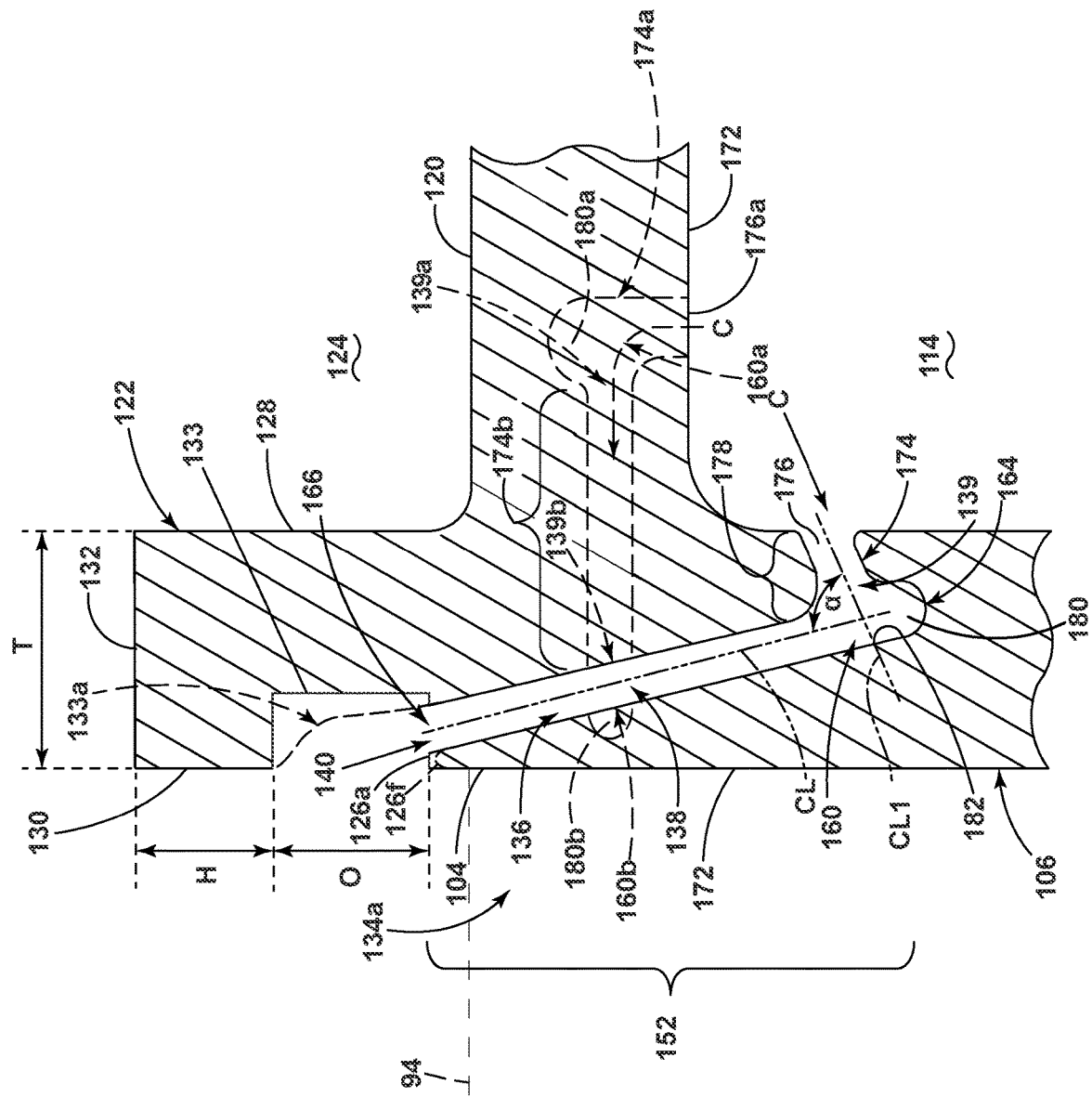
FIG. 6 is a cross-sectional view of cooling passages 134a from FIG. 3 according to an aspect of the disclosure herein.

FIG. 6 is a cross-sectional view of a cooling passage 136 from the first set of cooling passages 134a taken along line VI-VI of FIG. 3. The cooling passage 136 can include the passage outlet opening onto the first tip rim 126a. In an aspect of the disclosure herein, the first tip rim 126a can be infinitesimal, zero, or extend into the airfoil some measurable quantity as illustrated. It is further contemplated that the first tip rim 126a is a fillet tip rim 126f defining a rounded edge illustrated in dashed line at the passage outlet 140. It should be understood that the tip rim 126 as described herein in any aspect can be a fillet tip rim 126f.

The cooling passage 136 can include a first passage 174 to fluidly couple the diffusion slot 138 to the at least one cooling conduit 114 via the intermediate outlet 139. The first passage 174 can have a circular cross section, though it could have any cross-sectional shape. The first passage 174 can extend along a first centerline (CL1) between an inlet 176 fluidly coupled to the at least one cooling conduit 114 and the intermediate outlet 139. The first centerline (CL1) can form a second angle $\alpha$ between 40 and 140 degrees with the slot centerline (CL) at a junction 160 of the first passage 174 and the diffusion slot 138. It is further contemplated that the second angle $\alpha$ is substantially orthogonal, or 90 degrees.

The first passage 174 can define a metering section 178. The metering section 178 can be defined as the smallest, or minimum cross-sectional area of the first passage 174. The metering section 178 can extend along the first centerline (CL1) between the inlet 176 and the intermediate outlet 139 with the diameter (D). It is also contemplated that the metering section 178 have no length and is located at any portion of the cooling passage 136 where the cross-sectional area is the smallest. It is further contemplated that the inlet 176 defines the metering section 178 without extending into the cooling passage 136 at all. The cooling passage 136 as described herein can include multiple metering sections and is not limited to one as illustrated. The metering section 178 is for metering of the mass flow rate of the cooling fluid flow (C).

The intermediate outlet 139 of the first passage 174 can be spaced from the rear 164 to define a pocket 180. An impingement surface 182 can be located opposite the intermediate outlet 139 at the junction 160. The impingement surface 182 can define a portion of the diffusion slot 138. The impingement surface 182 can be located below the first tip rim 126a in the span-wise direction. Furthermore, the passage outlet 140 can be located above the tip 94 in the span-wise direction, or radially outward from the tip wall 120. It is contemplated that the impingement surface 182 is parallel to the outer wall 104. The proximity of the exterior 172 of the outer wall 104 to the cooling passage 136 can decrease as the diffusion slot 138 extends toward the upper tip rail surface 132. In other words, the rear 164 of the diffusion slot 138 can be spaced inward from the exterior 172 while the front 166 can be located on the first tip rim 126a proximate the exterior 172.

Other geometry layouts for the cooling passage 136 are contemplated and are illustrated in phantom. Rather than extending primarily in the span-wise direction with the single junction 160 between the first passage 174 and the diffusion slot 138, the cooling passage 136 can have a first passage 174a and an intermediate passage 174b fluidly connecting the first passage 174a to the diffusion slot 138. The first passage 174a can extend between an inlet 176a fluidly coupled to the at least one cooling conduit 114 and a first intermediate outlet 139a. The intermediate passage 174b can extend between the first intermediate outlet 139a and a second intermediate outlet 139b where the intermediate passage 174b can be fluidly coupled to the diffusion slot 138. The intermediate passage 174b can extend substantially parallel to the tip wall 120 as illustrated. Either the first passage 174a or the intermediate passage 174b or both the first passage 174a and the intermediate passage 174b can define a metering section 178 as described herein. Furthermore, additional pockets 180a, 180b, also illustrated in phantom, can be incorporated proximate additional junctions 160a, 160b as described herein. It is also contemplated that either one of the additional pockets 180a, 180b are not incorporated and rather an impingement surface as described herein is present. It is further contemplated that the cooling passage 136 is nonlinear as illustrated.

It should be understood that while illustrated with sharp corners and edges, the cavity 133 can have an aerodynamic geometry 133a having more rounded lines illustrated in dashed line. Depending on the implementation of the set of cooling passages 134a, the aerodynamic geometry 133a can be beneficial to increasing a laminar flow of the cooling fluid flow (C). In other implementations, the cavity 133 as illustrated with sharp edges can provide impingement and turbulated flow. Both geometries are contemplated for all the sets of cooling passages 134a, 134b, 134c, 134d, and 134e described herein.

In operation, the cooling fluid flow (C) can enter the cooling passage 136 and impinge on the impingement surface 182. Furthermore, the cooling fluid flow (C) can make a turn at junction 160. Turning can cause dust particles incapable of making the turn due to inertia to be collected in the pocket 180 in order to help maintain a clear cooling passage 136. The cooling fluid flow (C) can exhaust into the cavity 133 and onto the first tip rim 126a cooling the outer tip rail surface 130 with a cooling film coming off or out of the cavity 133.

Figure 7A:
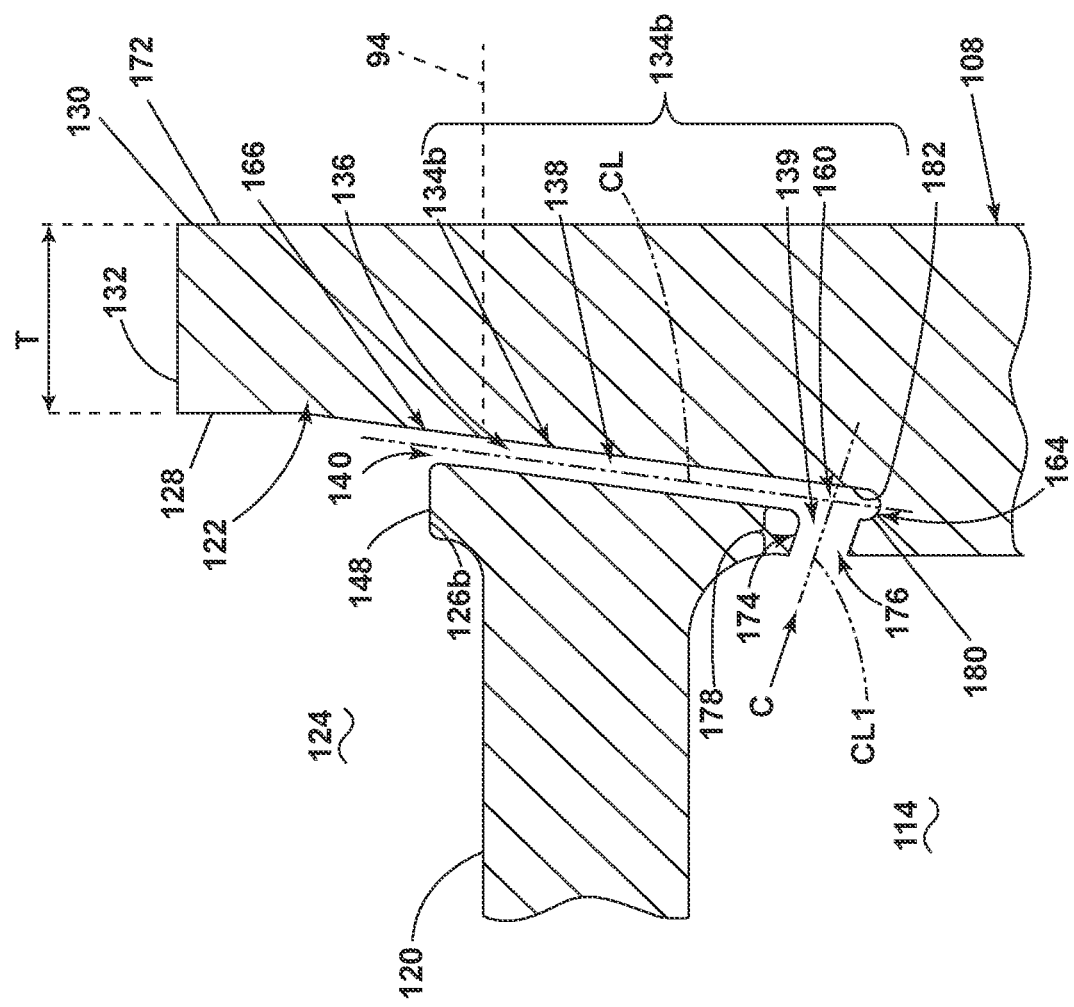
FIG. 7A is a cross-sectional view of cooling passages 134b from FIG. 3 according to another aspect of the disclosure herein.

FIG. 7A is a cross-sectional view of a cooling passage 136 from the second set of cooling passages 134b taken along line VII-VII of FIG. 3. The cooling passage 136 can include the passage outlet 140 opening proximate the second tip rim 126b. In an aspect of the disclosure herein, the second tip rim 126b can be infinitesimal or extend into the plenum 124 away from the inner tip rail surface 128 some measurable quantity to define the shelf 148 as illustrated. The second tip rim 126b can be a protrusion extending radially from the tip wall 120 into the plenum 124. The second set of cooling passages 134b can therefore cool the inner tip rail surface 128 and plenum 124. Other features are similar to those already discussed herein.

Figure 7B:
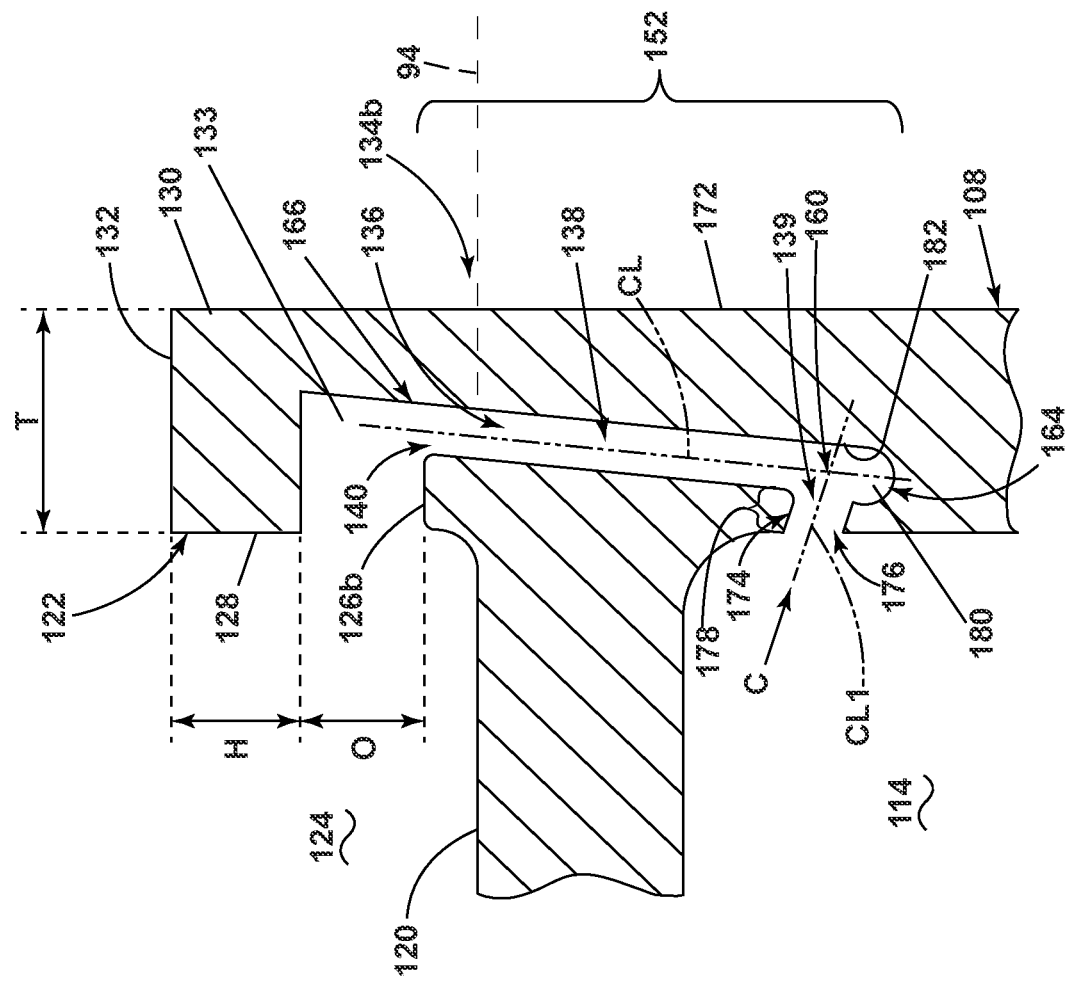
FIG. 7B is a cross-sectional view of a variation of the cooling passages 134b from FIG. 3 according to another aspect of the disclosure herein.

FIG. 7B is a cross-sectional view of a variation of the cooling passage 136 from the second set of cooling passages 134b taken along line VII-VII of FIG. 3. The cooling passage 136 can include the passage outlet 140 opening into the cavity 133. In an aspect of the disclosure herein, the second tip rim 126b can be infinitesimal or extend into the cavity 133 beyond the inner tip rail surface 128 some measurable quantity to define the shelf 148 as illustrated. The second set of cooling passages 134b can therefore cool the inner tip rail surface 128 and plenum 124. Other features are similar to those already discussed herein.

Figure 8:
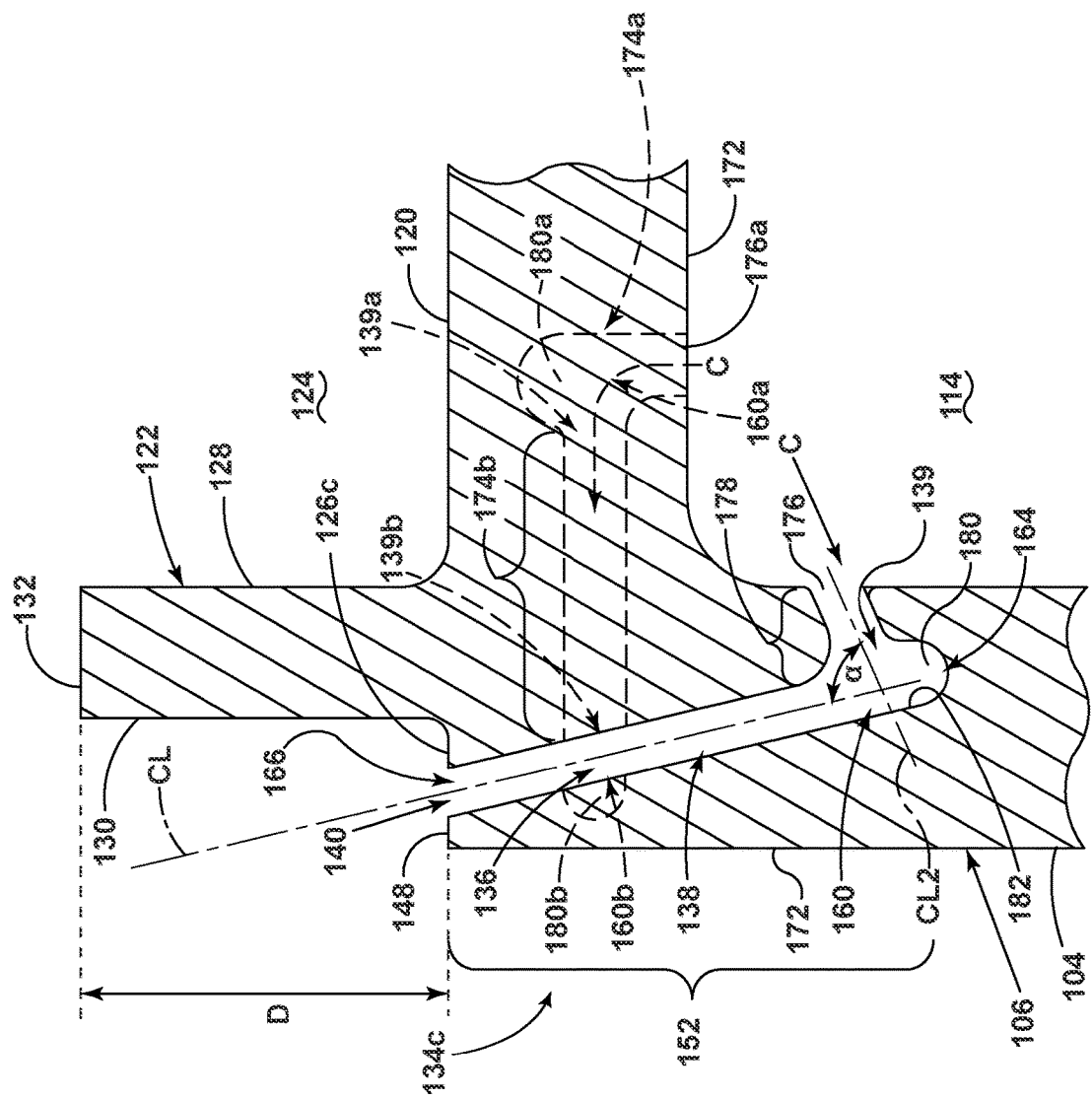
FIG. 8 is a cross-sectional view of cooling passages 134c from FIG. 4 according to another aspect of the disclosure herein.

FIG. 8 is a cross-sectional view of a cooling passage 136 from the second set of cooling passages 134c taken along line VIII-VIII of FIG. 4. The cooling passage 136 can include the passage outlet 140 opening onto the third tip rim 126c. In an aspect of the disclosure herein, the third tip rim 126c can be infinitesimal or extend into the airfoil some measurable quantity as illustrated. The third set of cooling passages 134c can therefore cool the outer tip rail surface 130. Other features are similar to those already discussed herein.

Figure 9:
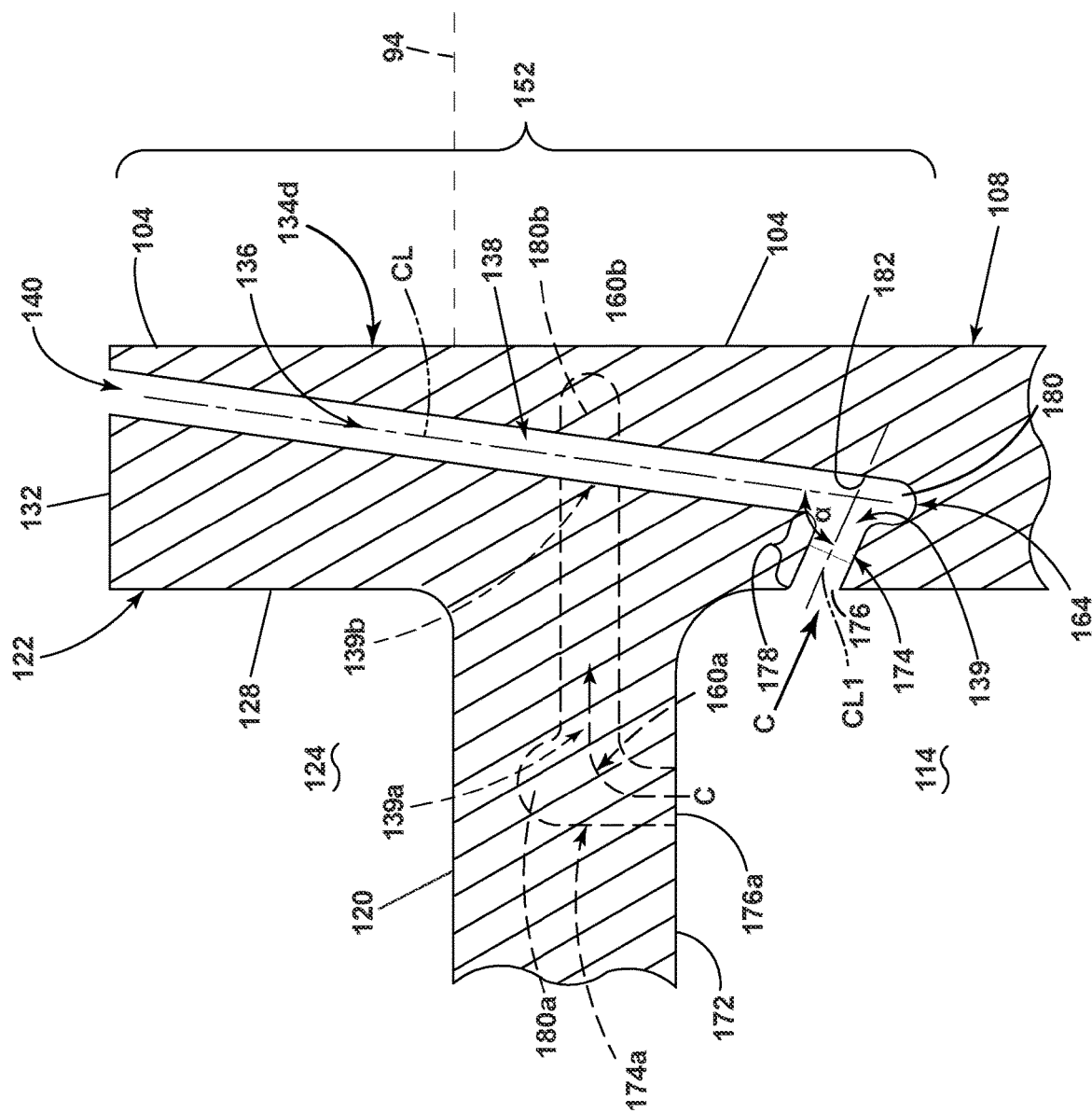
FIG. 9 is a cross-sectional view of cooling passages 134d from FIG. 4 according to yet another aspect of the disclosure herein.

FIG. 9 is a cross-sectional view of a cooling passage 136 from the fourth set of cooling passages 134d taken along line IX-IX of FIG. 4. The cooling passage 136 can include the passage outlet 140 opening onto the upper tip rail surface 132 of the tip rail 122. The fourth set of cooling passages 134d can therefore cool the upper tip rail surface 132. Other features are similar to those already discussed herein.

Figure 10:
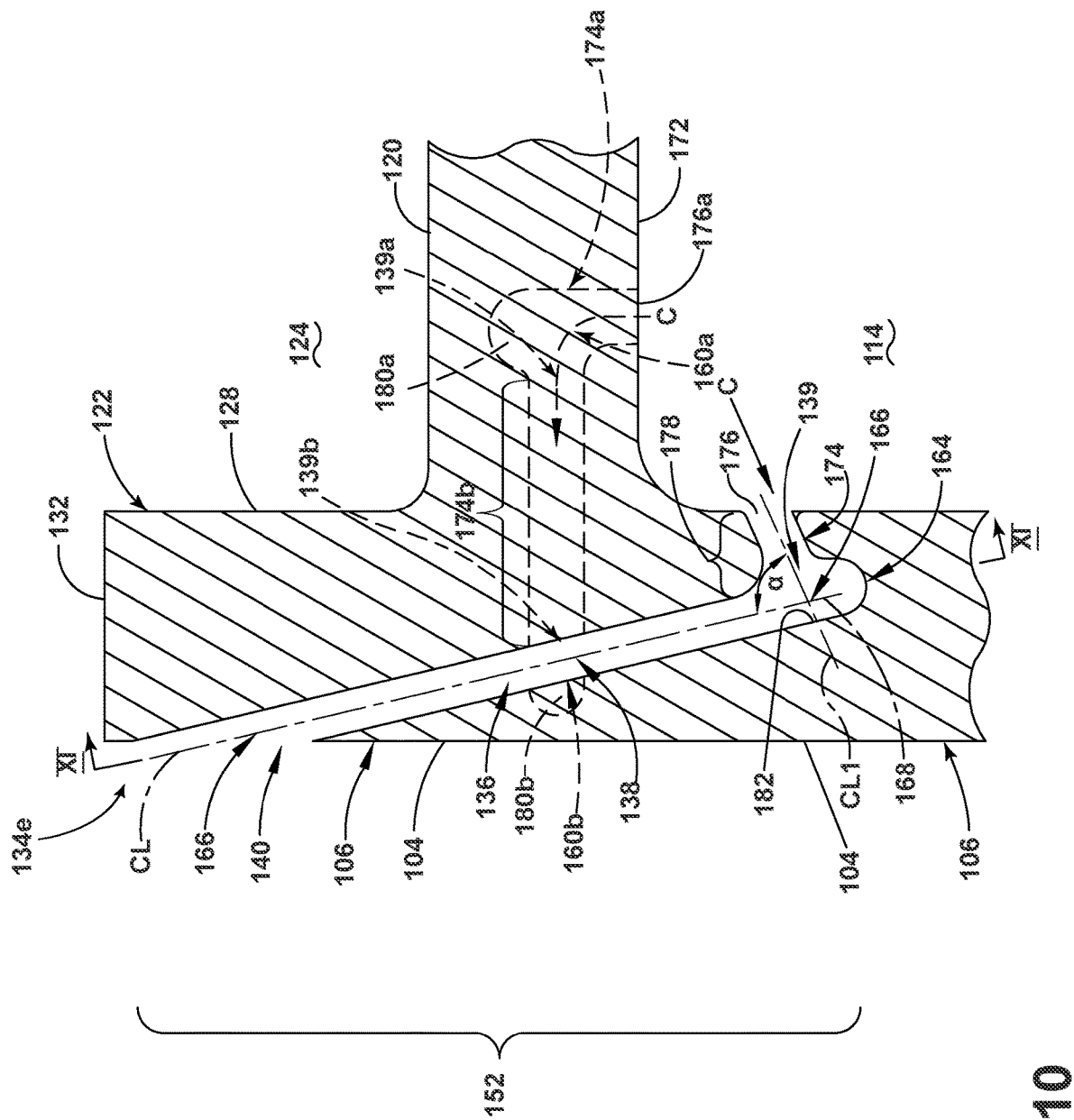
FIG. 10 is a cross-sectional view of cooling passages 134e from FIG. 4 according to yet another aspect of the disclosure herein.

FIG. 10 is a cross-sectional view of a cooling passage 136 from the fifth set of cooling passages 134e taken along line X-X of FIG. 4. The cooling passage 136 can include the passage outlet 140 opening along the outer wall 104 onto the outer tip rail surface 130 of the tip rail 122. The fifth set of cooling passages 134d can therefore cool the outer tip rail surface 122. Other features are similar to those already discussed herein.

Figure 11:
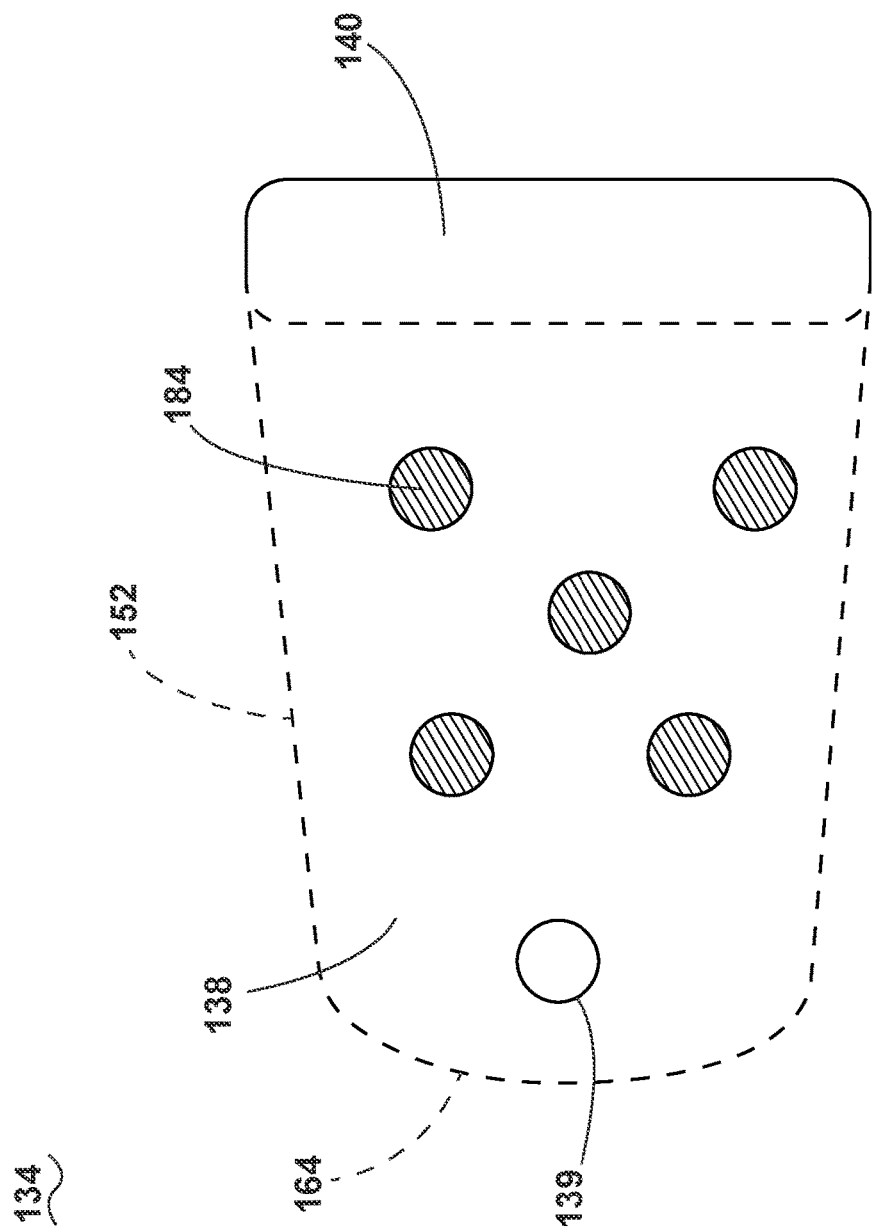
FIG. 11 is a cross-sectional view along line XI-XI of FIG. 10 illustrating flow enhancements according to an aspect of the disclosure herein.

FIG. 11 is a view of any one of the sets of cooling passages 134 described herein, by way of non-limiting example the fifth set of cooling passages 134d. It is contemplated that any of the sets of cooling passages 134 as described herein, can include a set of flow enhancers 184, by way of non-limiting example full height heat transfer coefficient (HTC) augmentation features such as pins, etc, or partial height HTC augmentation features such as turbulators, bumps, dimples, etc. A higher HTC causes an increase in cooling of the outer wall 104 along with an increase in the temperature of the cooling fluid (C). Balancing where the benefit of the cooling in one area outweighs the increase in temperature of the cooling fluid (C) is enabled by placement of the HTC augmentation features.

Figure 12:
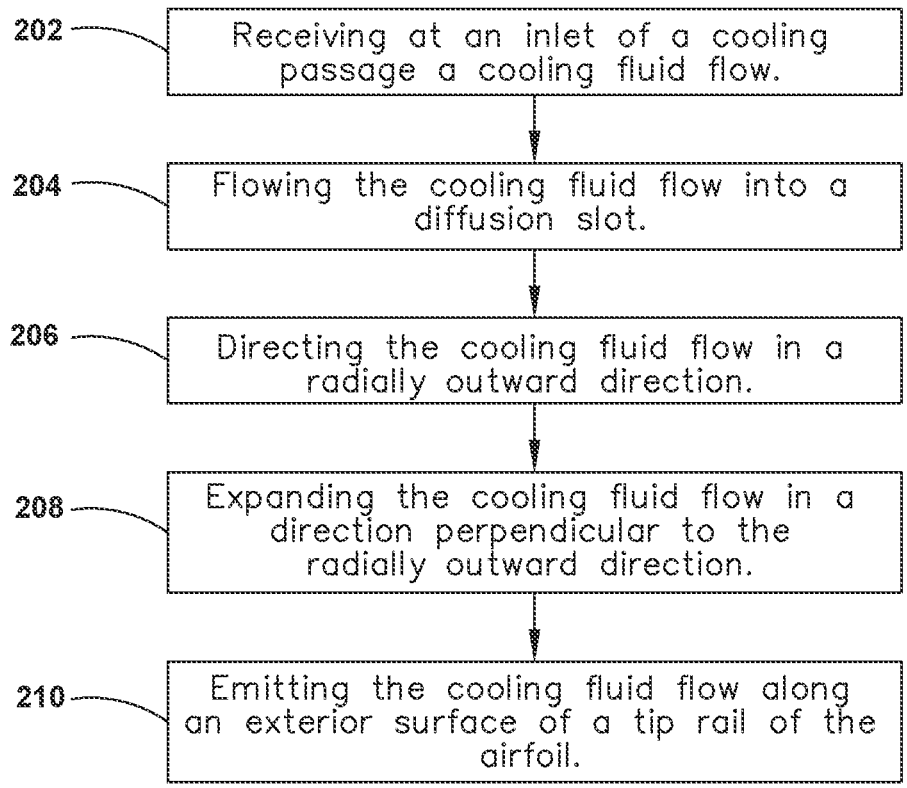
FIG. 12 is flow chart illustrating a method of cooling the airfoil with the set of cooling passages of FIG. 3.

FIG. 12 is a flow chart illustrating a method 200 for cooling the airfoil 92. The method 200 includes at 202 receiving at the inlet 176 of the cooling passage 136 a cooling fluid flow (C). At 204 flowing the cooling fluid flow (C) into the diffusion slot 138. The method can include impinging the cooling fluid flow (C) on the impingement surface 182 and turning the cooling fluid flow (C) from the first passage 174 to the diffusion slot 138. The method can further include at 206 directing the cooling fluid flow (C) in the radial direction (R) toward the tip rail 122. At 208 expanding the cooling fluid flow (C) in a direction perpendicular to the radial direction (R), by way of non-limiting example in the streamwise direction or a primarily axial direction. The method can include at 210 emitting the cooling fluid flow (C) along the exterior surface 172 of the tip rail 122.

The method 200 can further include emitting the cooling fluid flow (C) specifically along the tip rim 126. The cooling fluid flow (C) can form a film along any portion of the tip rail 122. It is further contemplated that the method 200 can include emitting the cooling fluid flow toward one of the downstream edge 112 or the upstream edge 110 of the airfoil 92.

Benefits associated with the disclosure as described herein include increased cooling effectiveness which results in increased hot gas path durability which in turn reduces service costs and better specific fuel consumption (SFC). Additionally, the geometry and location of the cooling passages as described herein improves film effectiveness in protecting the tip of an airfoil, and places impingement near the tip, which is a highly effective internal cooling mechanism.

Impingement along with immediate expansion of the cooling fluid within the diffusion slot contributes to high convection occurrence proximate the tip and tip rail. Additionally, introducing cooling fluid via the metered passage and then emitting the cooling fluid proximate to or along the tip surface increases film cooling effectiveness.

The cooling passages as described herein can be produced by additive and advanced casting manufacturing technologies. It should be appreciated that application of the disclosed design is not limited to turbine engines with fan and booster sections, but is applicable to turbojets and turbo engines as well.

The second cooling passage portion as described herein can also include a bend defining a turn prior to the junction. Furthermore, while the wall of the engine component described herein is illustrated as generally straight with an inner and outer surface parallel to each other, the engine component, or the airfoil as described herein, can be curved and oriented at an angle with respect to the combustion flow. While illustrated as generally consistent or continuously widening, the passage cross section as described herein can be collapsing, widening, etc. allowable variation in both directions. Variation can be nonlinear, nonconstant, etc.

The set of cooling passages as described herein can include at least two cooling passages that have surface outlets that are merged together, forming a trench. It is further contemplated that all the cooling passages in a set of cooling passages have surface outlets that merge together to form a trench. The trench can extend radially along the airfoil.

It should be appreciated that the cooling passages as described herein can be provided in any portion of an airfoil or engine component. Furthermore, it should be appreciated that the cooling passages as described herein can have additional applicability to other portions of an airfoil, such as the leading edge, the trailing edge, the pressure side, the suction side, the tip, the root, or even an interior structure of the airfoil, for example. Further still, the cooling hole geometry can have applicability in other engine components, beyond that of an airfoil, such as in a blade, a vane, a strut, a shroud, or a combustor liner in non-limiting examples.

The cooling passages and other complex geometries as described herein can be formed, for example, by additive manufacturing, while traditional methods of manufacture are contemplated. An additive manufacturing (AM) process is where a component is built layer-by-layer by successive deposition of material. AM is an appropriate name to describe the technologies that build 3D objects by adding layer-upon-layer of material, whether the material is plastic or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. Additive manufacturing, such as 3D printing, direct metal laser melting, direct metal laser sintering, or electroforming, can provide for forming the complex geometries as described herein, where such formation by way of traditional manufacture, such as casting or drilling, can be challenging, costly, or time consuming, as well as having poor yields. Further the cooling passages described herein can be produced via indirect additive method, i.e. print the cores and cast, or casting via additively producing a core, or making the core via RMC can also be utilized.

It should be appreciated that application of the disclosed design is not limited to turbine engines with fan and booster sections, but is applicable to turbojets and turbo engines as well.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

An engine component for a turbine engine having a working airflow separated into a cooling airflow and a combustion airflow, the engine component comprising a wall defining an interior and having an outer surface over which flows the combustion airflow, the outer surface defining a first side and a second side extending between an upstream edge and a downstream edge to define a streamwise direction and extending between a root and a tip to define a radial direction; a tip wall spanning the first side and second sides to close the interior at the tip; a tip rail extending from the tip wall and having an inner tip rail surface, which in combination with the tip wall, at least partially bounds a region defining a plenum, the tip rail having an outer tip rail surface extending from at least one of the first and second sides, and radially terminating in an upper tip rail surface connecting the inner tip rail surface and the outer tip rail surface; a tip rim formed in the outer wall in at least one of the first and second sides and spaced from the upper tip rail surface in the radial direction, at least one cooling conduit provided in the interior; a set of cooling passages formed in the outer wall and fluidly coupling the at least one cooling conduit to the outer surface, at least one of the cooling passages in the set comprising a diffusion slot extending along a flow direction toward the tip between a rear and a passage outlet opening onto the tip rim, the diffusion slot defining a slot centerline along which a diffuser vector extends between the rear and the passage outlet, at least one metered passage having an inlet fluidly connected to the at least one cooling conduit and an intermediate outlet fluidly coupled to the diffusion slot at a junction proximate the rear of the diffusion slot, and defining a first centerline, which forms an angle relative to the slot centerline.

The engine component of any preceding clause wherein the tip rim is formed in the outer tip rail surface.

The engine component any preceding clause wherein the tip rim terminates in an edge wall extending toward the downstream edge and the upper tip rail surface.

The engine component any preceding clause wherein the edge wall terminates at the upper tip rail surface.

The engine component any preceding clause further comprising a cavity extending in the streamwise direction and spaced from the tip, the cavity defining the tip rim.

The engine component of any preceding clause wherein at least one of the cavity and tip rim comprises a rounded geometry.

The engine component any preceding clause wherein the tip rim is formed in the inner tip rail surface.

The engine component any preceding clause wherein the tip rim is located between the tip wall and the upper tip rail surface.

The engine component any preceding clause wherein the at least one cooling passage is multiple cooling passages extending between the upstream edge and the downstream edge.

The engine component any preceding clause wherein when moving from the upstream edge to the downstream edge, the multiple cooling passages have diffuser vectors that point increasingly toward the downstream edge.

The engine component any preceding clause wherein the intermediate outlet is spaced from the rear to define a pocket.

The engine component any preceding clause wherein the at least one cooling passage is multiple cooling passages extending between the upstream edge and the downstream edge and a diffuser length varies amongst the multiple cooling passages.

The engine component any preceding clause wherein an increase in cross-sectional area along the flow direction is defined by a first angle.

The engine component any preceding clause wherein the at least one cooling passage is multiple cooling passages extending between the upstream edge and the downstream edge and the first angle varies amongst the multiple cooling passages.

The engine component any preceding clause, further comprising a second set of cooling passages formed in the outer wall and fluidly coupling the at least one cooling conduit to the outer surface, at least one of the cooling passages in the second set of cooling passages comprising a diffusion slot increasing in cross-sectional area in a flow direction toward the tip and terminating in a passage outlet opening onto the upper tip rail surface.

The engine component any preceding clause wherein an impingement surface is located opposite the intermediate outlet along a portion of the diffusion slot.

The engine component any preceding clause further comprising flow enhancement structures within the diffusion slot.

A method for cooling an airfoil extending between a root and a tip to define a radial direction and having a cooling passage, the method comprising receiving at an inlet of the cooling passage a cooling fluid flow; flowing the cooling fluid flow through the cooling passage and into a diffusion slot; directing the cooling fluid flow in a primarily radial direction within the diffusion slot; expanding the cooling fluid flow in a direction perpendicular to the primarily radial direction within the diffusion slot; emitting the cooling fluid flow from the diffusion slot at a passage outlet opening along an exterior surface of a tip rail of the airfoil.

The method of any preceding clause, further comprising impinging the cooling fluid flow on an impingement surface within the cooling passage.

The method of any preceding clause, further comprising turning the cooling fluid flow from a first passage to the diffusion slot.

The method of any preceding clause wherein the expanding includes expanding the cooling fluid flow in a streamwise direction.

The method of preceding clause, further comprising emitting the cooling fluid flow at a passage outlet opening along a tip rim in the tip rail.

The method of preceding clause, further comprising emitting the cooling fluid flow toward one of an upstream edge or a downstream edge of the airfoil.

What is claimed is:

1. An engine component for a turbine engine having a working airflow separated into a cooling airflow and a combustion airflow, the engine component comprising:
    an outer wall defining an interior and having an outer surface over which flows the combustion airflow, the outer surface defining a first side and a second side extending between an upstream edge and a downstream edge to define a streamwise direction and extending between a root and a tip to define a radial direction;
    a tip wall spanning the first side and second sides to close the interior at the tip;
    a tip rail extending from the tip wall and having an inner tip rail surface, which in combination with the tip wall, at least partially bounds a region defining a plenum, the tip rail having an outer tip rail surface extending from at least one of the first and second sides, and radially terminating in an upper tip rail surface connecting the inner tip rail surface and the outer tip rail surface;
    a tip rim formed in at least one of the outer surface or the inner tip rail surface and spaced from the upper tip rail surface in the radial direction,
    at least one cooling conduit provided in the interior;
    a set of cooling passages formed in the outer wall and fluidly coupling the at least one cooling conduit to at least one of the outer surface or the inner tip rail surface, at least one of the cooling passages in the set comprising:
        a diffusion slot extending along a flow direction toward the tip between a rear and a passage outlet opening onto the tip rim, the diffusion slot defining a slot centerline along which a diffuser vector extends between the rear and the passage outlet, at least one metered passage having an inlet fluidly connected to the at least one cooling conduit and an intermediate outlet fluidly coupled to the diffusion slot at a junction proximate the rear of the diffusion slot, and defining a first centerline, which forms an angle relative to the slot centerline.

2. The engine component of claim 1 wherein the tip rim is formed in the outer tip rail surface.

3. The engine component of claim 2 wherein the tip rim terminates in an edge wall extending toward the downstream edge and the upper tip rail surface.

4. The engine component of claim 3 wherein the edge wall terminates at the upper tip rail surface.

5. The engine component of claim 3 further comprising a cavity extending in the streamwise direction and spaced from the tip, at least a portion of the cavity defining the tip rim.

6. The engine component of claim 5 wherein at least one of the cavity and tip rim comprises a rounded geometry.

7. The engine component of claim 6 wherein the tip rim is located between the tip wall and the upper tip rail surface.

8. The engine component of claim 1 wherein the tip rim is formed in the inner tip rail surface.

9. The engine component of claim 1 wherein the at least one cooling passage is multiple cooling passages extending between the upstream edge and the downstream edge.

10. The engine component of claim 9 wherein when moving from the upstream edge to the downstream edge, the multiple cooling passages have diffuser vectors that point increasingly toward the downstream edge.

11. The engine component of claim 1 wherein the intermediate outlet is spaced from the rear to define a pocket.

12. The engine component of claim 11 wherein the at least one cooling passage is multiple cooling passages extending between the upstream edge and the downstream edge and a diffuser length varies amongst the multiple cooling passages.

13. The engine component of claim 1, further comprising a second set of cooling passages formed in the outer wall and fluidly coupling the at least one cooling conduit to the outer surface, at least one of the cooling passages in the second set of cooling passages comprising a diffusion slot extending in a flow direction toward the tip and terminating in a passage outlet opening onto the upper tip rail surface.

14. The engine component of claim 1 wherein an impingement surface is located opposite the intermediate outlet along a portion of the diffusion slot.

15. The engine component of claim 1, further comprising at least one flow enhancement structure within the diffusion slot.

16. A method for cooling an engine component of claim 1 in the form of an airfoil extending between a root and a tip to define a radial direction and including the at least one cooling passage, the method comprising:
 receiving at the inlet of the at least one cooling passage a cooling fluid flow;
 flowing the cooling fluid flow through the at least one cooling passage and into the diffusion slot;
 directing the cooling fluid flow in a primarily radial direction within the diffusion slot;
 expanding the cooling fluid flow in a direction perpendicular to the primarily radial direction within the diffusion slot; and
 emitting the cooling fluid flow from the diffusion slot at the passage outlet opening along an exterior surface of the tip rail of the airfoil.

17. The method of claim 16, further comprising impinging the cooling fluid flow on an impingement surface within the at least one cooling passage.

18. The method of claim 17, further comprising turning the cooling fluid flow from a first passage to the diffusion slot.

19. The method of claim 16, further comprising emitting the cooling fluid flow at a passage outlet opening along a tip rim in the tip rail.

20. The method of claim 16, further comprising emitting the cooling fluid flow toward one of an upstream edge or a downstream edge of the airfoil.

* * * * *